United States Patent
Naganuma

(10) Patent No.: US 9,276,734 B2
(45) Date of Patent: Mar. 1, 2016

(54) CONFIDENTIAL COMPUTATION SYSTEM, CONFIDENTIAL COMPUTATION METHOD, AND CONFIDENTIAL COMPUTATION PROGRAM

(75) Inventor: Ken Naganuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 41 days.

(21) Appl. No.: 14/238,123

(22) PCT Filed: Sep. 27, 2011

(86) PCT No.: PCT/JP2011/072009
§ 371 (c)(1),
(2), (4) Date: Feb. 10, 2014

(87) PCT Pub. No.: WO2013/046320
PCT Pub. Date: Apr. 4, 2013

(65) Prior Publication Data
US 2014/0208101 A1      Jul. 24, 2014

(51) Int. Cl.
G06F 21/60 (2013.01)
H04L 9/00 (2006.01)
H04L 9/30 (2006.01)

(52) U.S. Cl.
CPC ............ *H04L 9/008* (2013.01); *H04L 9/3093* (2013.01); *G06F 21/60* (2013.01)

(58) Field of Classification Search
None
See application file for complete search history.

(56) References Cited

U.S. PATENT DOCUMENTS

2011/0110525 A1    5/2011   Gentry

FOREIGN PATENT DOCUMENTS

| JP | 2005-084568 A | 3/2005 |
| JP | 2011-002810 A | 1/2011 |

OTHER PUBLICATIONS

Craig Gentry 2009 ACM—Fully homomorphic-encryption using ideal lattices; obtained on Jun. 21, 2015; from:Google search.*
Craig Gentry 2009 NPL—Fully Homomorphic encryption scheme; obtained on Jun. 7, 2015; from Google search.*
Marten van Dijk Jun. 2010 NPL; obtained on Jun. 10, 2015; from Google search.*

* cited by examiner

Primary Examiner — Jung Kim
Assistant Examiner — Tri Tran
(74) Attorney, Agent, or Firm — Volpe and Koenig, P.C.

(57) ABSTRACT

A client executes processing for data encryption by adding an error vector to plaintext, the error vector being not larger than a predetermined criterion and processing for sending limitation information to a server, the limitation information being formed from a sublattice basis of a lattice generated by a secret key. The server executes processing for receiving the limitation information and storing it in a storage device and in the homomorphic computation processing on the encrypted data received from the client, processing for, when a bit length of ciphertext which is a result of the homomorphic computation processing is equal to or larger than a predetermined value, reducing the bit length of the ciphertext to a value not larger than a predetermined threshold by translating a vector of the ciphertext to an inside of a region formed from the sublattice basis corresponding to the stored limitation information.

5 Claims, 11 Drawing Sheets

CONFIDENTIAL COMPUTATION SYSTEM, CONFIDENTIAL COMPUTATION METHOD, AND CONFIDENTIAL COMPUTATION PROGRAM

TECHNICAL FIELD

The present invention relates to a confidential computation system, a confidential computation method, and a confidential computation program, and more specifically to a technique for enabling efficient computations to be executed on outsourced data in a confidential form in a computer of a party to which the data is outsourced, while maintaining favorable security.

BACKGROUND ART

In recent years, an operational management form of an information system called cloud computing has come under the spotlight. In the cloud computing, for the purposes of efficient development of the information system, cost reduction in operational management thereof, and the like, users outsource an information system to an outside contractor instead of owning computation resources themselves. The cloud computing enables efficiency improvement and cost reduction, but on the other hand, since there are two different parties, an administrative service provider offering an information system implementing the cloud computing and a user of the information system, the user tends to feel insecure about outsourcing confidential information to the administrative service provider which is an outside contractor. For this reason, confidentiality of outsourced data needs to be ensured in advance by using an encryption technology in order to prevent misappropriation of the outsourced data.

However, in a simple encryption method, basic computations on encrypted data such as addition and multiplication, or statistical processing, computation of function values, or the like combining those basic computations can be executed only by a party capable of decrypting the data. Thus, the outside administrator of the information system, which is a party to which data is outsourced, cannot perform the various kinds of computation processing on the encrypted data. To overcome such a situation, various measures such as assigning a dedicated staff to the outsourcing contractor need to be taken, but such measures work against the cost reduction purpose, which is the original reason of employing the cloud computing.

As one of techniques for overcoming such a situation, there has been proposed an encryption method allowing a client to perform computation of arbitrary function values on data in a confidential form while outsourcing the data to a server. For example, there has been proposed an encryption method (see PLT 1) allowing Boolean addition and Boolean multiplication to be performed on bit data in a confidential form by utilizing the fact that computation of arbitrary functions executable on a computer can be represented by a combination of Boolean addition and Boolean multiplication.

CITATION LIST

Patent Literature

[PTL 1] US Patent Application Publication No. 2011/0110525

SUMMARY OF INVENTION

Technical Problem

The above-described conventional technique and the like perform encryption by adding an error vector to plaintext bit data. However, every time Boolean computation is performed on the encrypted data, the error vector inside the encrypted data increases in size. Once the size of the error vector exceeds a specific threshold, it is highly likely that correct function values cannot be derived by a decryption algorithm.

To overcome this problem, the conventional technique proposes a method in which, in order to reduce the error vector in the encrypted data, encrypted data and an encrypted secret key for decryption are inputted to an encrypted decryption function circuit, and the data is re-encrypted into encrypted data having a smaller error vector with no change made on the plaintext. By re-encrypting the data into ciphertext with a smaller error vector, the Boolean computation can be performed again until the error vector reaches a threshold. However, there is a requirement to perform this method, which is that the amount of increase in the error vector caused by the computation of the decryption function circuit needs to be equal to or smaller than the threshold. The increase in the error vector can be made no larger than the threshold by setting a sufficiently small vector as the error vector added in the first encryption of plaintext bit data. However, a small error vector allows a lattice reduction attack using a public key, and is therefore not appropriate from a security perspective. Thus, the conventional technique proposes a technique for executing re-encryption, while using a method called squashing to suppress the increase in the error vector caused by the computation of the decryption function circuit. However, this squashing poses problems of drastically increasing the data length of encrypted data as well as the amount of calculation needed for re-encryption, and is therefore not a realistic measure.

Thus, in view of the above circumstances, the present invention has an objective of enabling efficient computations to be executed on outsourced data in a confidential form in a computer of a party to which the data is outsourced, while maintaining favorable security.

Solution to Problem

A confidential computation system which is a computer system comprising: a client configured to execute data encryption by a homomorphic encryption method using a secret key and send data obtained by the encryption to a server; and the server configured to execute homomorphic computation processing on the encrypted data received from the client and return a result of the computation to the client. The confidential computation system is characterized in that: the client executes processing for executing the data encryption by adding an error vector to plaintext, the error vector being not larger than a predetermined criterion, and processing for sending limitation information to the server, the limitation information being formed from a sublattice basis of a lattice generated by the secret key; and the server executes processing for receiving the limitation information from the client and storing the limitation information in a storage device, and processing, performed in carrying out the homomorphic computation processing on the encrypted data received from the client, for reducing a bit length of ciphertext which is being subjected to the homomorphic computation processing or is a result of the homomorphic computation processing, to a value not larger than a predetermined threshold by translating a vector of the ciphertext to an inside of a region formed by the sublattice basis corresponding to the stored limitation information when the bit length of the ciphertext is equal to or larger than the predetermined value.

Advantageous Effects of Invention

According to the present invention, efficient computations can be executed on outsourced data in a confidential form in a computer of a party to which the data is outsourced, while maintaining favorable security.

DESCRIPTION OF EMBODIMENTS

System Configuration

Figure 1:
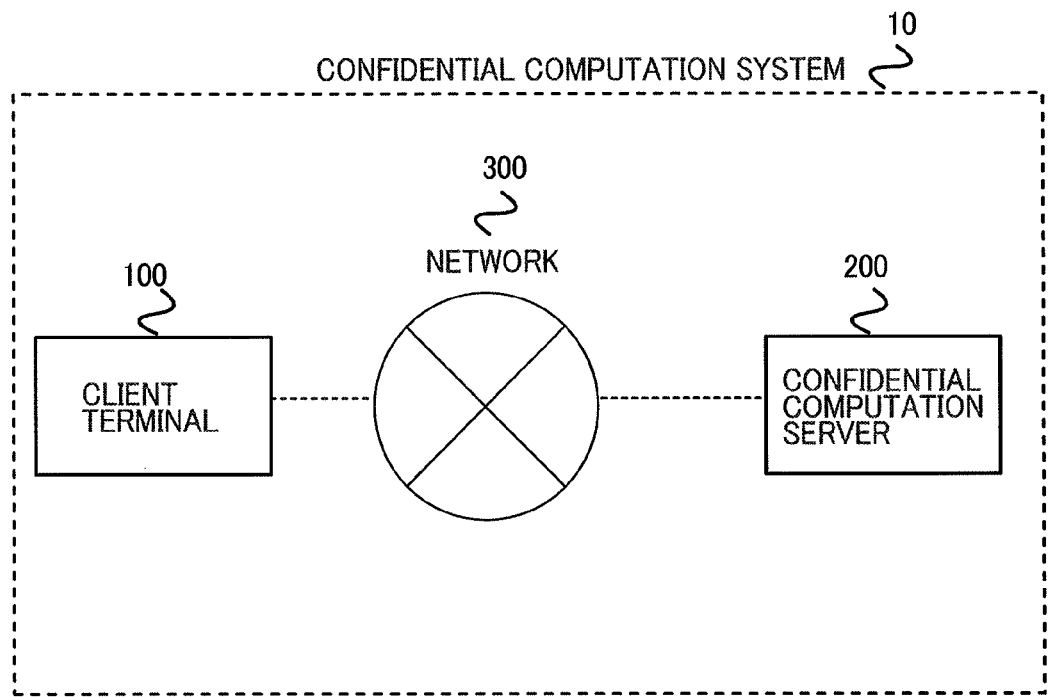
FIG. 1 is a diagram showing an example configuration of a confidential computation system of the present embodiment.

An embodiment of the present invention is described in detail below using the drawings. FIG. 1 is a diagram showing an example configuration of a confidential computation system 10 of the present embodiment. The confidential computation system 10 (hereinafter called the system 10) shown in FIG. 1 is a computer system including: a client configured to encrypt data with a secret key by a homomorphic encryption method and send the encrypted data to a server; and the server configured to execute homomorphic computation processing on the encrypted data received from the client and send the computation result to the client. The computer system enables efficient computations to be executed on outsourced data in a confidential form in a computer of a party to which the data is outsourced, while maintaining favorable security.

As shown in FIG. 1, the system 10 of the present embodiment includes a client terminal 100 corresponding to the client of the present invention and a confidential computation server 200 corresponding to the server of the present invention, and the client terminal 100 and the confidential computation server 200 are configured to be able to exchange data with each other via a network 300.

Figure 2:
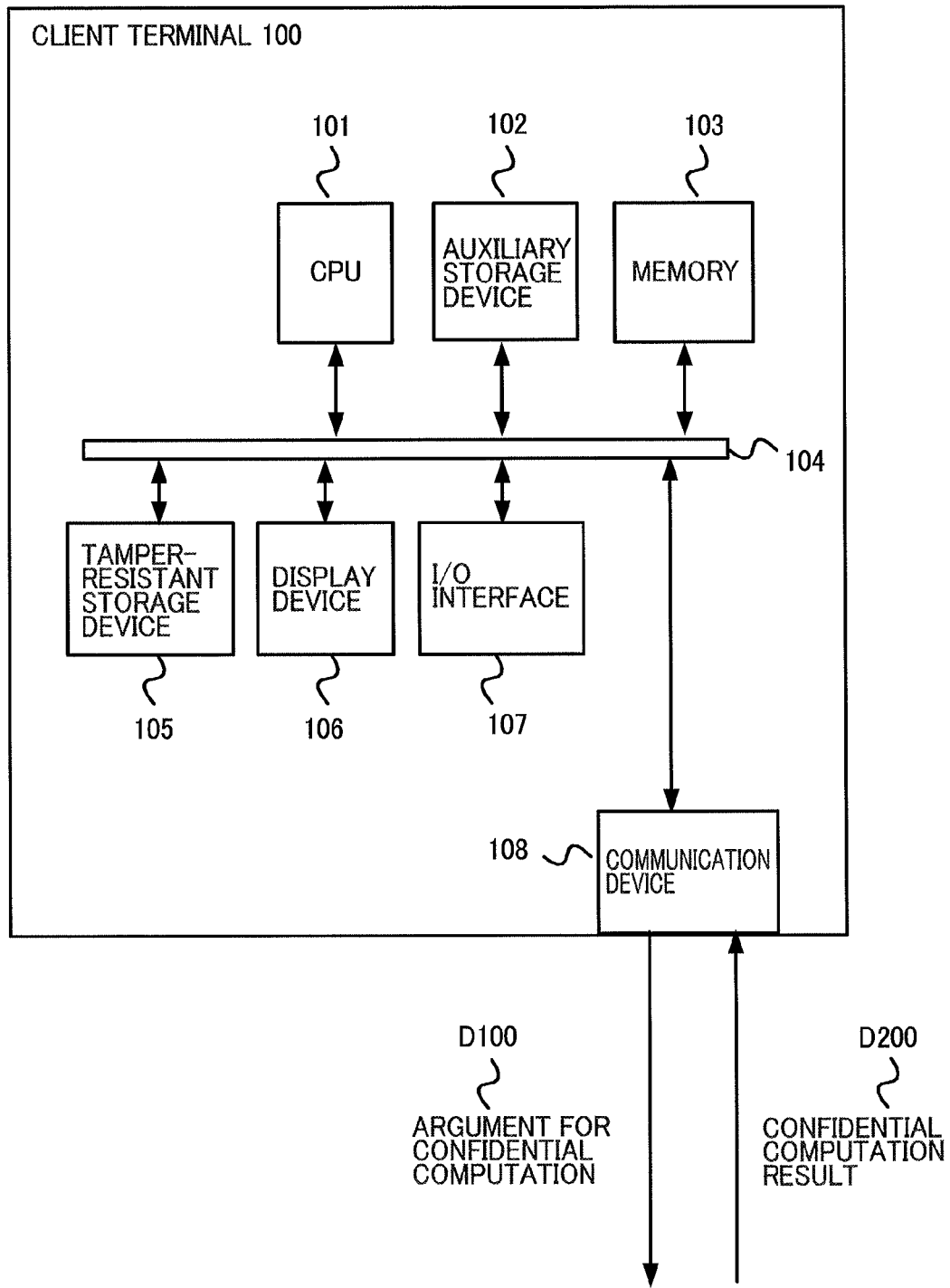
FIG. 2 is a diagram showing an example configuration of a client terminal of the present embodiment.

The client terminal 100 and the confidential computation server 200 constituting the system 10 have the following hardware configurations. FIG. 2 shows an example configuration of the client terminal 100 of the present embodiment. As shown in FIG. 2, the client terminal 100 has a CPU 101, an auxiliary storage device 102 formed by an appropriate non-volatile storage device such as a hard disk drive, a memory 103 formed by a volatile storage device such as a RAM, a tamper-resistant storage device 105, a display device 106, such as a display configured to display processed data, an I/O interface 107 such as a keyboard and a mouse, and a communication device 108 connected to the network 300 to perform processing for communication with the confidential computation server 200. These devices are connected to one another with an internal signal line 104. The CPU 101 is a computing device configured to execute programs stored in the auxiliary storage device 102 by, for example, reading them onto the memory 103 to perform overall control of the client terminal 100. The CPU 101 also performs processing for various judgments, computations, and controls. The auxiliary storage device 102 stores therein in advance not only the programs but also plaintext data to be encrypted and a secret key used for encryption.

Figure 3:
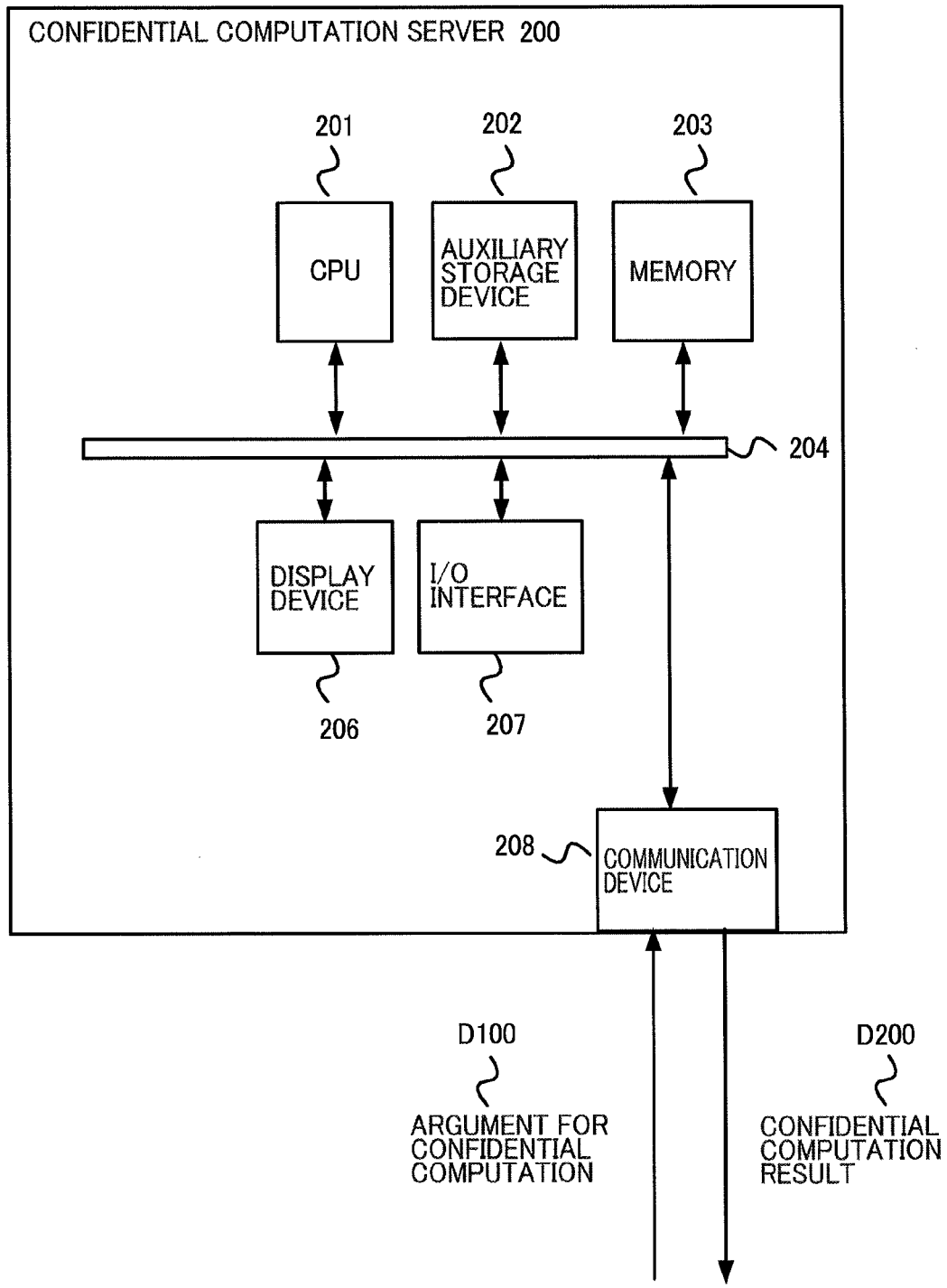
FIG. 3 is a diagram showing an example configuration of a confidential computation server of the present embodiment.

FIG. 3 is a diagram showing an example configuration of the confidential computation server 200 of the present embodiment. The confidential computation server 200 has a CPU 201, an auxiliary storage device 202 formed by an appropriate non-volatile storage device such as a hard disk drive, a memory 203 formed by a volatile storage device such as a RAM, a display device 206, such as a display configured to display processed data, an I/O interface 207 such as a keyboard and a mouse, and a communication device 208 connected to the network 300 to perform processing for communication with the client terminal 100. These devices are connected to one another with an internal signal line 204. The CPU 201 is a computing device configured to execute programs stored in the auxiliary storage device 202 by, for example, reading them onto the memory 203 to perform overall control of the confidential computation server 200. The CPU 201 also performs processing for various judgments, computations, and controls.

Next, a description is given of capabilities of the client terminal 100 and the confidential computation server 200 constituting the confidential computation system 10 of the present embodiment. As described above, the capabilities to be described below are implemented by the programs in the auxiliary storage devices executed by the client terminal 100 and the confidential computation server 200.

Note that encryption performed in the present embodiment is performed by a homomorphic encryption method using a secret key.

The client terminal 100 of the system 10 has a capability of encrypting plaintext data read from the auxiliary storage device 102 by adding an error vector to the plaintext data, the error vector being not larger than a predetermined criterion. Data obtained by the encryption, i.e., encrypted data is sent from the client terminal 100 to the confidential computation server 200. The encrypted data sent from the client terminal 100 to the confidential computation server 200 is targeted for homomorphic computation processing.

The client terminal 100 also has a capability of sending the confidential computation server 200 ciphertext limitation information (limitation information) formed from a sublattice basis of a lattice generated by the secret key read from the auxiliary storage device 102.

The client may preferably include a capability of deriving a matrix product of a secret key matrix stored in the auxiliary storage device 102 and a predetermined non-singular matrix of integer coefficients, and sending a matrix represented by the matrix product to the confidential computation server 200 as the ciphertext limitation information.

On the other hand, the confidential computation server 200 has a capability of receiving the ciphertext limitation information from the client terminal 100 and storing the ciphertext limitation information in the auxiliary storage device 202 or the memory 203.

The confidential computation server 200 also has a capability of receiving the encrypted data from the client terminal 100 and executing homomorphic computation processing on the encrypted data. The confidential computation server 200 also has the following capability. Specifically, in performing this computation processing, when the bit length of ciphertext which is being subjected to the computation processing or is a result of the computation processing is equal to or larger than a predetermined threshold, the confidential computation server 200 translates a vector of the ciphertext to the inside of a region formed from a sublattice basis corresponding to the stored ciphertext limitation information to reduce the bit length of the ciphertext to a value not larger than the predetermined threshold.

The confidential computation server 200 may preferably include a capability of specifying, in a linear combination of column vectors of a limitation information matrix indicated by the ciphertext limitation information received from the client terminal 100, a vector having the largest Euclidean distance from an origin among all the vectors each multiplied by a coefficient whose absolute value is 1 or smaller, and setting a distance between the specified vector and the origin to the predetermined threshold.

Term Definitions

Here, definitions are given for terms used in the present embodiment.
(1) An ideal lattice basis $B=(b1, b2, \ldots, bn)$: This is defined similarly to those in PTL 1. Specifically, the ideal lattice basis $B=(b1, b2, \ldots, bn)$ is an n-dimensional integer coefficient vector basis satisfying ideal lattice conditions.
(2) Ciphertext limitation information: This is a lattice basis $P=(p1, p2, \ldots, pn)$ obtained from a matrix product of the ideal lattice basis $B=(b1, b2, \ldots, bn)$ which is a secret key for generating ciphertext and a randomly-generated nxn non-singular matrix U of integer coefficients.
(3) A confidential computation program: This refers to processing in the present embodiment for performing a Boolean computation step m times by using the ciphertext (encrypted data) as an input value.
(4) An internal variable for confidential computation function: This is the name of a variable in which an output value of each step in the confidential computation program is stored so as to use the output value as an input value for the next step.
(5) An argument for confidential computation: This is ciphertext or a combination of pieces of ciphertext generated by the homomorphic encryption method by the client terminal 100 and is used an input value for the confidential computation program.
(6) A norm: This refers to a Euclidean norm. Specifically, $S=v1 \times v1+v2 \times v2+\ldots, +vn \times vn$ is found for n-dimensional integral coefficient vectors $(v1, v2, \ldots, vn)$, and the square root of the value S is the norm of the n-dimensional integral coefficient vectors $(v1, v2, \ldots, vn)$.
(7) A threshold L: When a real-coefficient linear combination is $a1 \times p1+a2 \times p2+\ldots an \times pn$ where $0<ai<=1$ for the lattice basis (ciphertext limitation information) $P=(p1, p2, \ldots, pn)$, L is the norm of the vector having the largest norm among all the vectors in the linear combination.

Overall Processing Flow

With reference to a drawing, a description is given below of an actual procedure of a confidential computation method of the present embodiment. Various operations in the confidential computation method to be described below are implemented by the programs executed by the client terminal 100 and the confidential computation server 200 constituting the system 10 by reading them onto the memory or the like. These programs are formed with codes for performing various operations to be described below.

Figure 4:
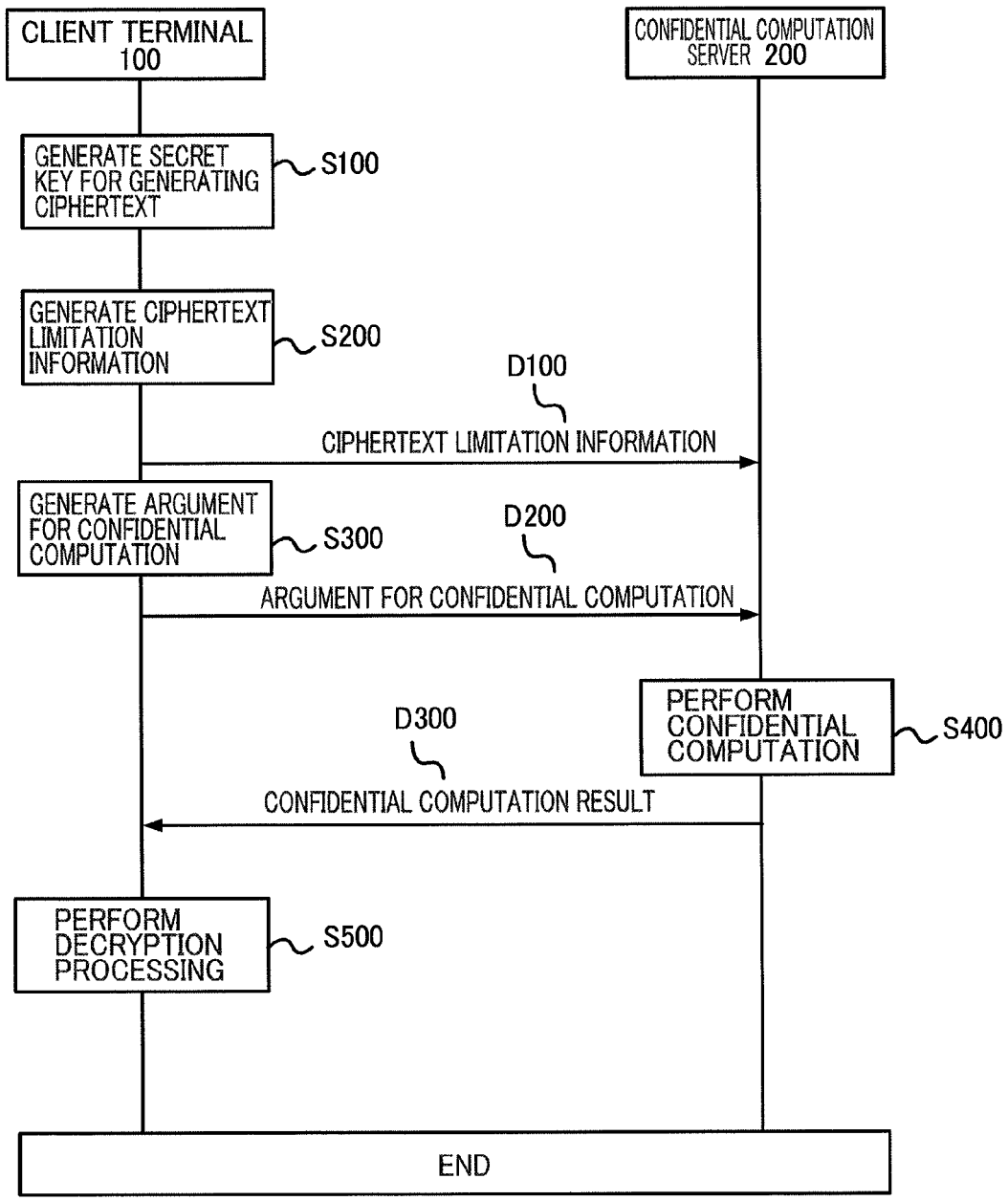
FIG. 4 is a flowchart showing a processing procedure example 1 of a confidential computation method of the present embodiment.

FIG. 4 is a flowchart showing a processing procedure example 1 of the confidential computation method in the present embodiment, and is, more specifically, a flow showing transmission and reception of various pieces of data for confidential computation between the client terminal 100 and the confidential computation server 200.

First, in response to a user command received for example through the I/O interface 107, the client terminal 100 generates a secret key for generating ciphertext by executing a program for generating a secret key for generating ciphertext (S100). Processing for this generation of a secret key for generating ciphertext will be described in detail later.

Next, in response to a user command or to the execution of Step S100, the client terminal 100 generates ciphertext limitation information by executing a program for generating ciphertext limitation information (S200). The client terminal 100 then sends the ciphertext limitation information (D100) thus generated to the confidential computation server 200 on the network 300 by use of the communication device 108. Processing for this generation of ciphertext limitation information will be described in detail later.

Next, in response to a user command or to the execution of Step S200, the client terminal 100 generates ciphertext to be inputted to a confidential computation program by executing a program for generating an argument for confidential computation (S300), and sends the ciphertext, as an argument for confidential computation (D200), to the confidential computation server 200 by use of the communication device 108. Processing for this generation of an argument for confidential computation will be described in detail later.

Meanwhile, the confidential computation server 200 receives the ciphertext limitation information (D100) and the argument for confidential computation (D200) from the client terminal 100, and by using these as input values, executes confidential computation processing by executing the confidential computation program (S400). The confidential computation server 200 then sends an output value of the confidential computation program, namely a confidential computation result (D300), to the client terminal 100 on the network 300 by use of the communication device 203. Processing for this confidential computation will be described in detail later.

Meanwhile, the client terminal 100 receives the confidential computation result (D300) from the confidential computation server 200 and performs decryption processing by executing a decryption processing program using the received confidential computation result (D300) as an input value (S500). The client terminal 100 obtains an output value of the decryption program as a computation result, and then terminates this processing. This decryption processing will be described in detail later.

Processing for Generating Secret Key for Generating Ciphertext

Figure 5:
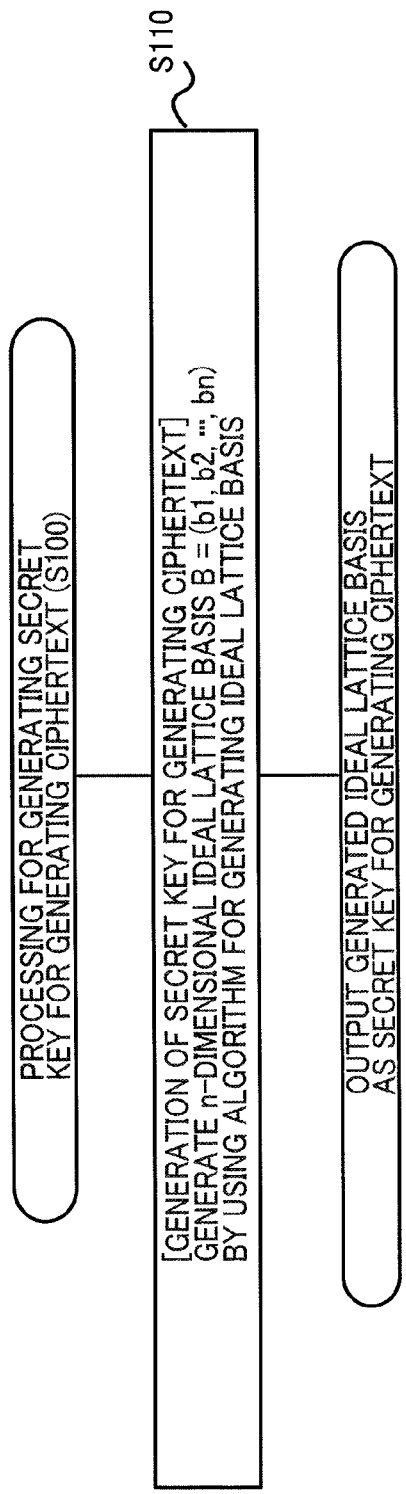
FIG. 5 is a flowchart showing a processing procedure example 2 of the confidential computation method of the present embodiment.

Next, the processing for generating a secret key for generating ciphertext is described based on a drawing. FIG. 5 is a flowchart showing a processing procedure example 2 of the confidential computation method of the present embodiment, and is, more specifically, a diagram showing the processing performed by the program for generating a secret key for generating ciphertext (S100) in the processing flow in FIG. 4.

First, the client terminal 100 generates an n-dimensional ideal lattice basis B=(b1, b2, . . . , bn) by using a predetermined algorithm for generating an ideal lattice for a secret key (S110), and stores the generated ideal lattice basis in the tamper-resistant storage device 105 as a secret key for generating ciphertext. Note that the algorithm for generating an ideal lattice for a secret key, encryption functions, and decryption functions in the program for generating a secret key for generating ciphertext used in the present embodiment may be those used in the conventional technique in PTL 1 (a secret-key generation program, an encryption function program, and a decryption function program).

Processing for Generating Ciphertext Limitation Information

Figure 6:
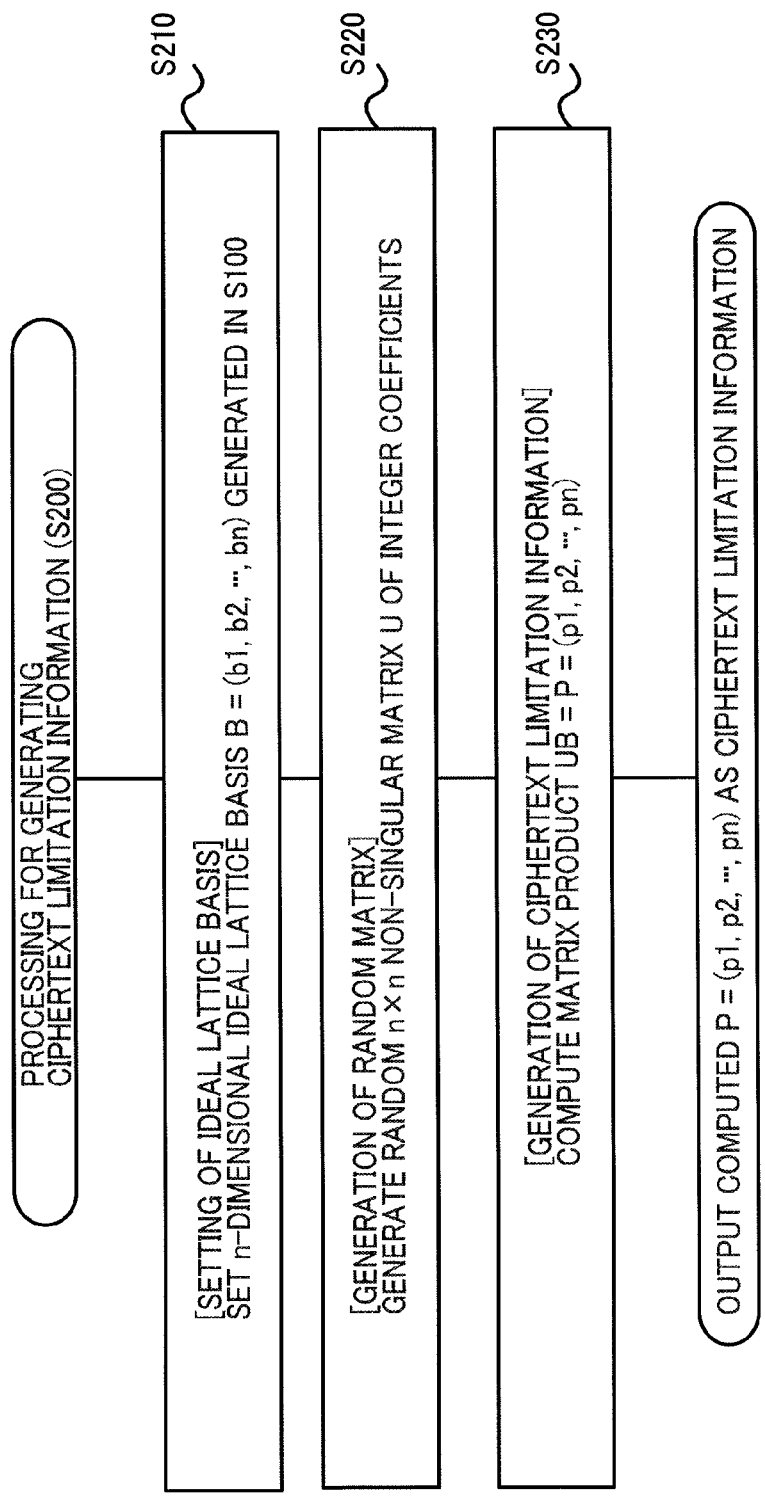
FIG. 6 is a flowchart showing a processing procedure example 3 of the confidential computation method of the present embodiment.

Next, the processing for generating ciphertext limitation information is described based on a drawing. FIG. 6 is a flowchart showing a processing procedure example 3 of the confidential computation method of the present embodiment, and is, more specifically, a diagram showing the processing performed by the program for generating ciphertext limitation information (S200) in the processing flow in FIG. 4.

First, the client terminal 100 stores the n-dimensional ideal lattice basis B=(b1, b2, . . . , bn) in a storage area in, for example, the memory 103 secured for computation (S210), the n-dimensional ideal lattice basis B being the secret key for generating ciphertext generated by the program for generating an ideal lattice for a secret key (FIG. 5: S100).

Next, the client terminal 100 generates a random nxn non-singular matrix U of integer coefficients by using a predetermined algorithm of an existing technique (S220), and multiplies the n-dimensional ideal lattice basis B set in the memory 103 by this random nxn non-singular matrix U of integer coefficients (S230). The client terminal 100 outputs a result of this matrix multiplication performed in Step S230 as ciphertext limitation information represented as a matrix "P=(p1, p2, . . . , pn)". This ciphertext limitation information is to be sent from the client terminal 100 to the confidential computation server 200.

Processing for Generating Argument for Confidential Computation

Figure 7:
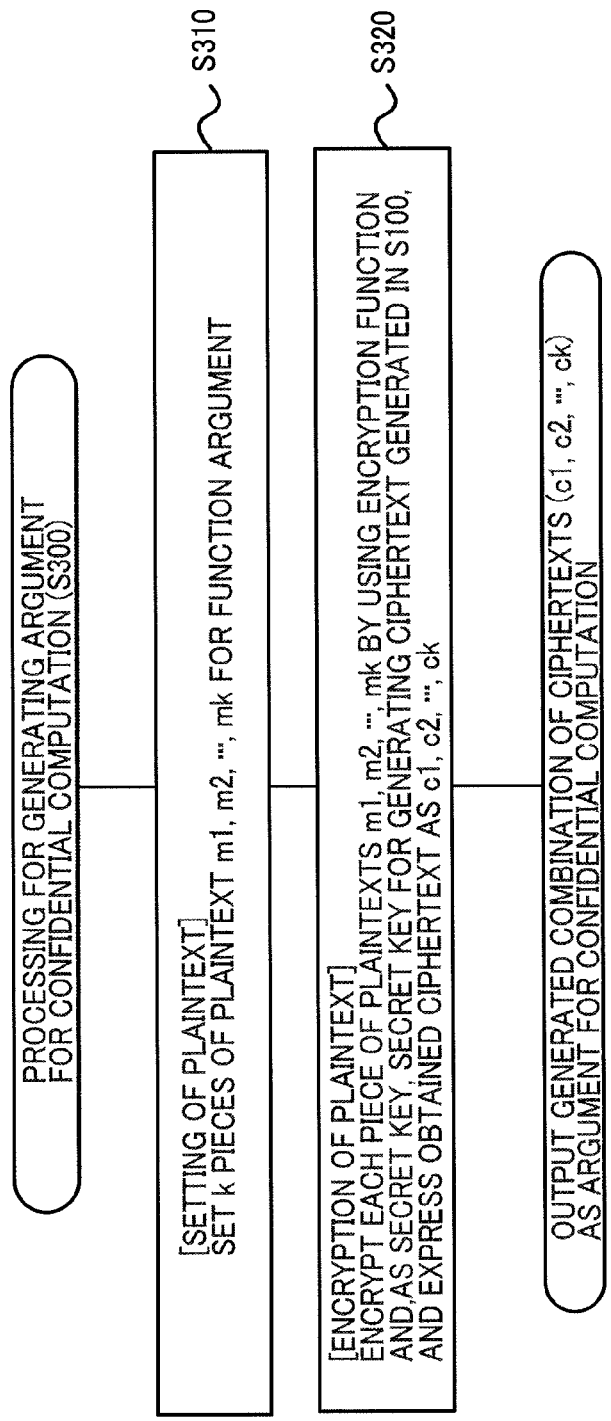
FIG. 7 is a flowchart showing a processing procedure example 4 of the confidential computation method of the present embodiment.

Next, the processing for generating an argument for confidential computation is described based on a drawing. FIG. 7 is a flowchart showing a processing procedure example 4 of the confidential computation method of the present embodiment, and is, more specifically, a diagram showing the processing performed by the program for generating an argument for confidential computation (S300) in the processing flow in FIG. 4.

First, in response to a user command received through the I/O interface, the client terminal 100 reads, from the auxiliary storage device 102, k pieces of plaintext m1, m2, . . . , mk for function argument, i.e., source data of encrypted data to be targeted for confidential computation, and stores the plaintext m1, m2, . . . , mk in a storage area in, for example, the memory 103 secured for computation (S310).

Then, the client terminal 100 encrypts each piece of the plaintext m1, m2, . . . , mk set in the memory 103 by using, as a secret key, the secret key B for generating ciphertext generated in the processing performed by the program for generating a secret key for generating ciphertext (S100) and by using a predetermined encryption function corresponding to the homomorphic encryption method (which encryption function may be an existing one), and thereby obtains k pieces of ciphertext as a matrix "c1, c2, . . . , ck" (S320). Then, the client terminal 100 outputs the matrix to the confidential computation server 200 as an argument for confidential computation.

Confidential Computation Processing

Figure 8:
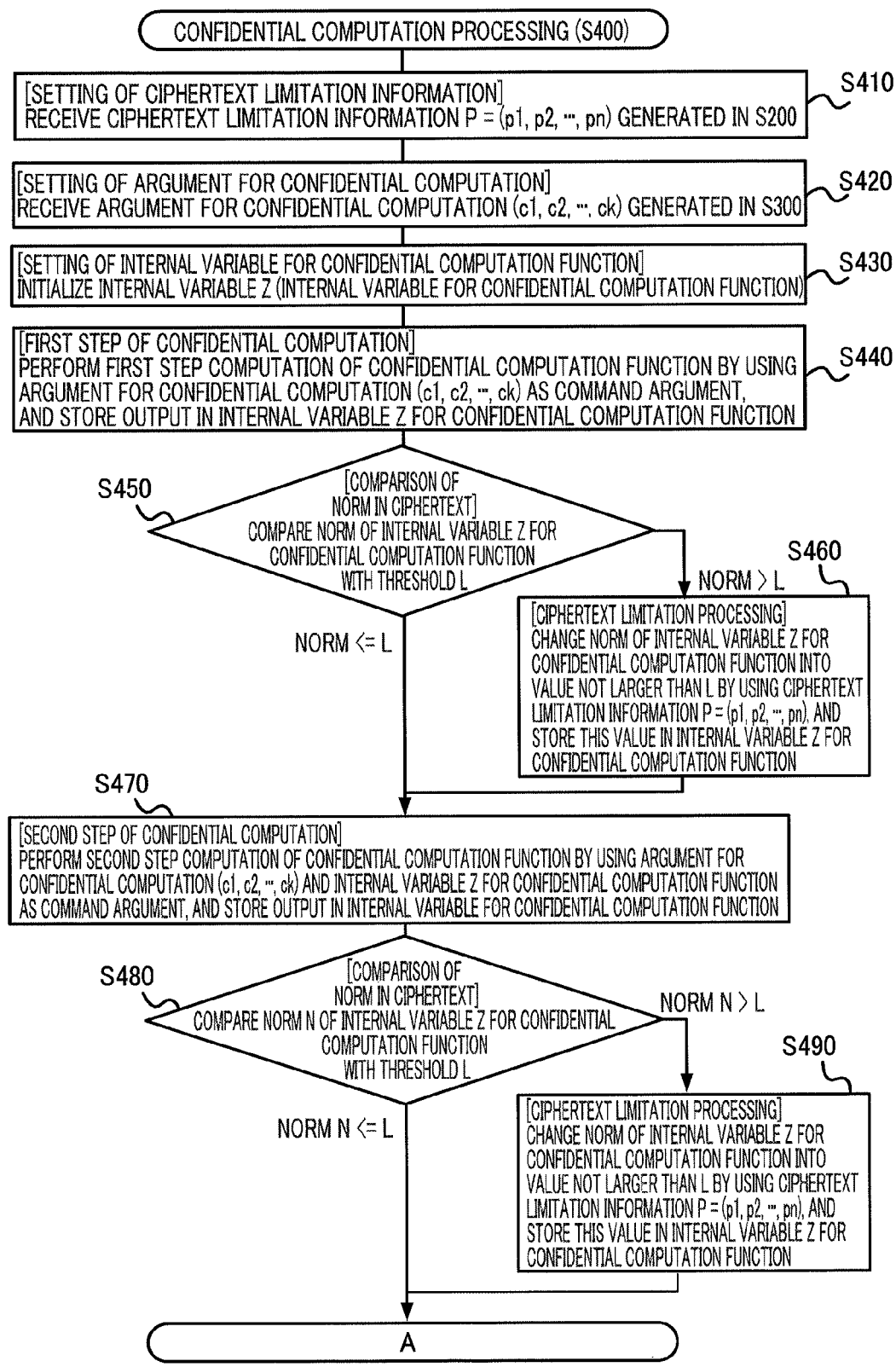
FIG. 8 is a flowchart showing a processing procedure example 5 of the confidential computation method of the present embodiment.
Figure 9:
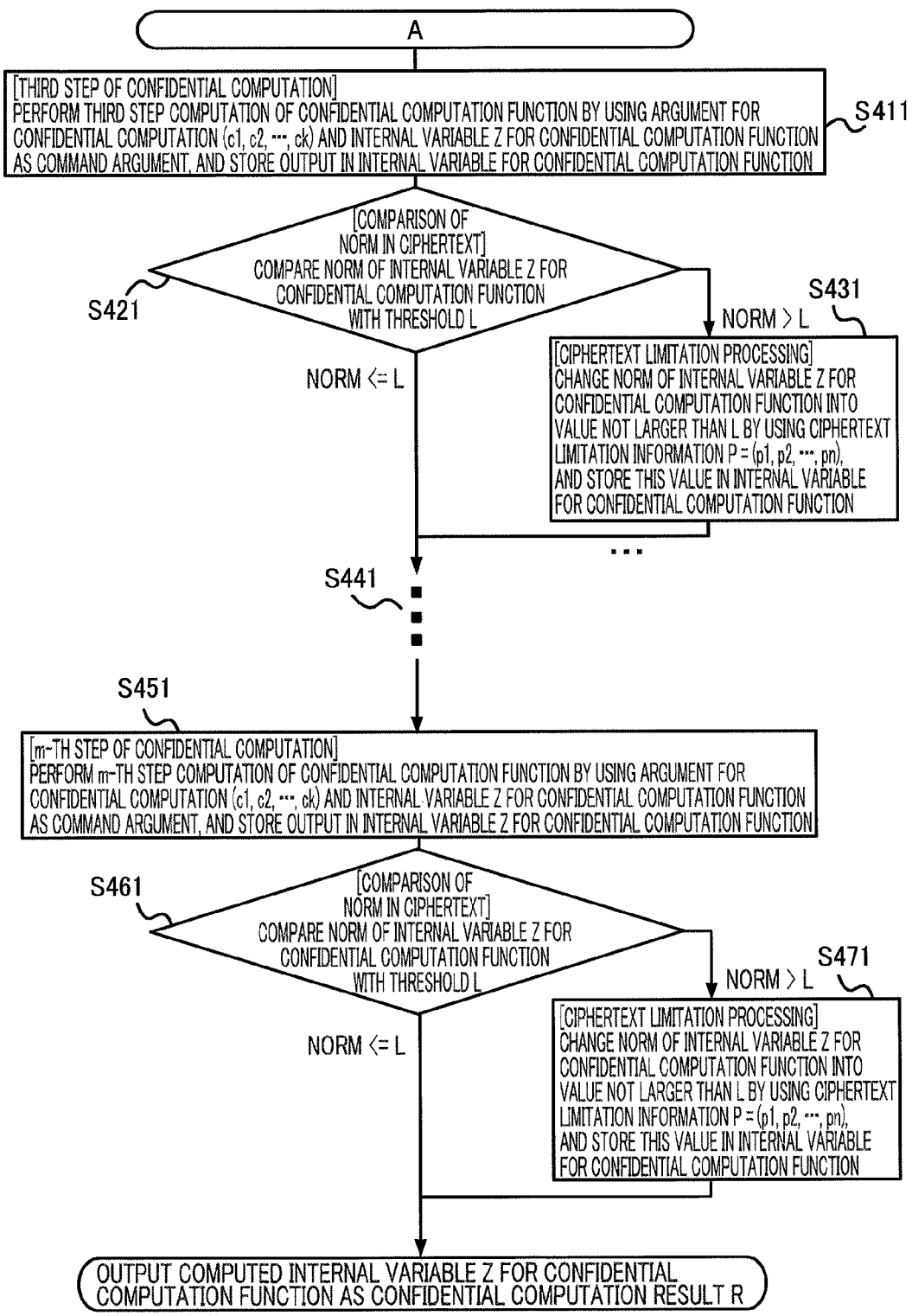
FIG. 9 is a flowchart showing a processing procedure example 6 of the confidential computation method of the present embodiment.

Next, the confidential computation processing is described based on drawings. FIG. 8 is a flowchart showing a processing procedure example 5 of the configuration computing method of the present embodiment, and FIG. 9 is a flowchart showing a processing procedure example 6 of the configuration computing method of the present embodiment. Specifically, FIGS. 8 and 9 are diagrams showing a flow of the confidential computation processing (S400) performed by the confidential computation server 200 in the processing flow in FIG. 4.

First, from the client terminal 100, the confidential computation server 200 receives the ciphertext limitation information P=(p1, p2, . . . , pn) generated by the client terminal 100 in Step S200 (S410).

The confidential computation server 200 also receives the argument for confidential computation (c1, c2, . . . , ck) generated by the client terminal 100 in Step S300 from the client terminal 100 (S420). A specific example conceivable as the argument for confidential computation is, for example, personal information requiring statistical processing with confidentiality thereof being maintained. In the present embodiment, for example, there are m individuals as statistical targets, and the confidential computation is performed for a total of m steps (first to m-th steps) to add up predetermined values each indicated by the personal information of each individual. Such an example is assumed here.

The confidential computation server 200 initializes an internal variable Z for confidential computation function (S430), computes a first step of the confidential computation function by using the argument for confidential computation (c1, c2, . . . , ck) acquired in Step S420 as a command argument, and stores the output in the internal variable Z for confidential computation function (S440). The confidential computation function is a function for performing binomial computation such as addition and multiplication in the homomorphic encryption method capable of performing computation on ciphertext without plaintext or a secret key. As a matter of course, the confidential computation server 200 has a program for such a confidential computation function in the auxiliary storage device 102 or the like in advance.

Next, the confidential computation server 200 compares a norm of the internal variable Z for confidential computation function with a threshold L (S450), and proceeds to processing for performing a second step of the confidential computation function if the value of the norm is equal to or smaller than the threshold L (S450: norm=<L). If, on the other hand, the norm exceeds the threshold L (S450: norm>L), the confidential computation server 200 changes the norm of the internal variable Z for confidential computation function into a value not larger than L by using the ciphertext limitation information P=(p1, p2, ..., pn), stores the value in the internal variable Z for confidential computation function, and proceeds to processing for performing the second step of the confidential computation function (S460).

Note that the threshold L is obtained by the confidential computation server 200 by specifying, in a linear combination formed by column vectors of the matrix of the ciphertext limitation information, a vector having the largest Euclidean distance from the origin among all the vectors each multiplied by a coefficient whose absolute value is 1 or smaller, and setting the distance between the specified vector and the origin as the threshold L.

Figure 11:
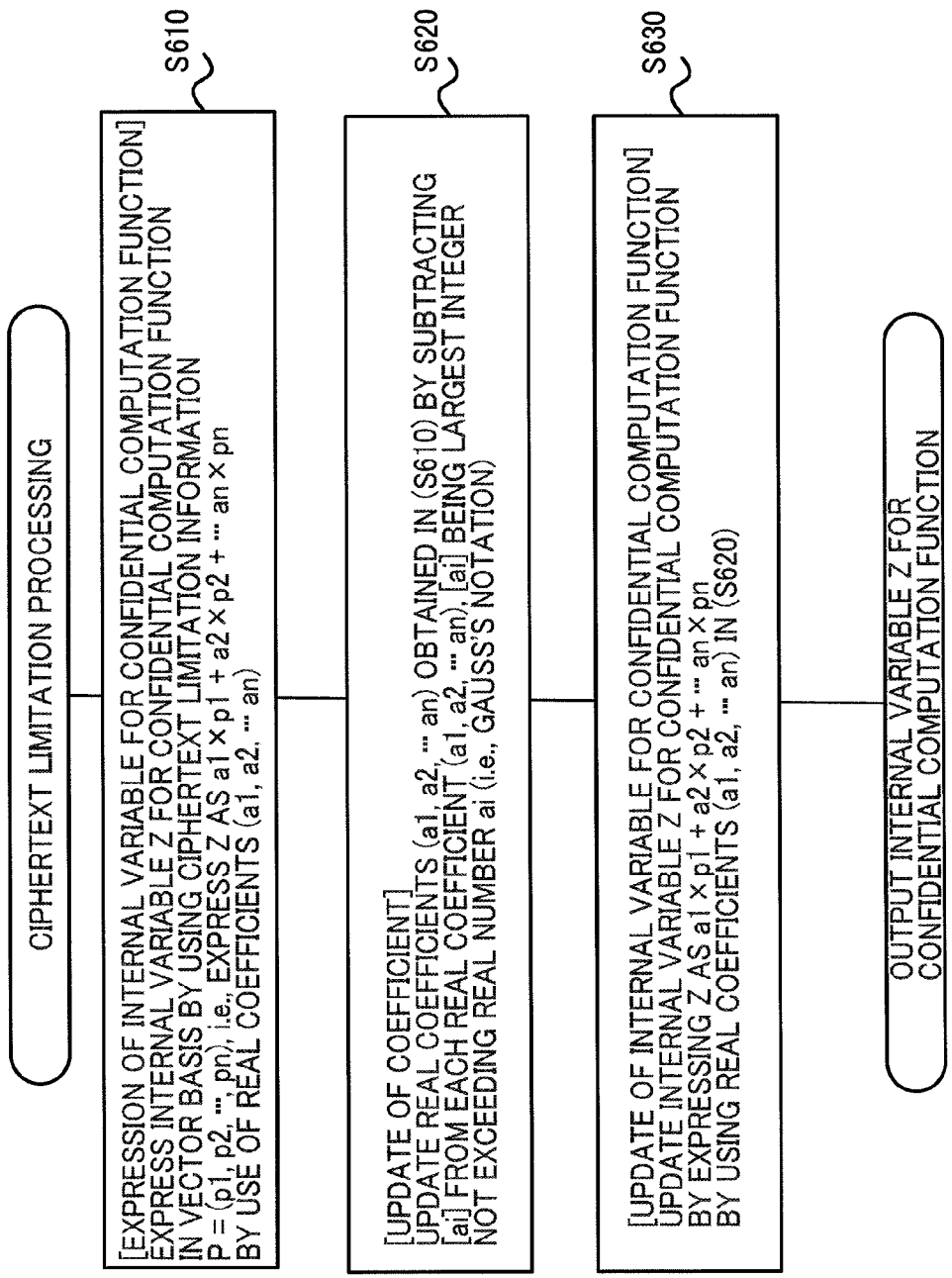
FIG. 11 is a flowchart showing a processing procedure example 8 of the confidential computation method of the present embodiment.

The processing for changing the norm of the internal variable Z for confidential computation function into a value not larger than L by using the ciphertext limitation information P=(p1, p2, ..., pn), namely ciphertext limitation processing, will be described later with reference to FIG. 11.

Next, the confidential computation server 200 performs computation of the second step of the confidential computation function by using the argument for confidential computation (c1, c2, ..., ck) and the internal variable Z for confidential computation function as a command argument, and stores the output in the internal variable Z for confidential computation function (S470). Next, the confidential computation server 200 compares a norm of the internal variable Z for confidential computation function with the threshold L (S480), and proceeds to processing for performing a third step of the confidential computation function if the value of the norm is equal to or smaller than the threshold L (S480: norm=<L). If, on the other hand, the norm exceeds the threshold L (S480: norm>L), the confidential computation server 200 changes the norm of the internal variable Z for confidential computation function into a value not larger than L by using the ciphertext limitation information P=(p1, p2, ..., pn), stores the value in the internal variable Z for confidential computation function, and proceeds to processing for performing the third step of the confidential computation function (S490).

Next, the confidential computation server 200 performs computation of the third step of the confidential computation function by using the argument for confidential computation (c1, c2, ..., ck) and the internal variable Z for confidential computation function as a command argument, and stores the output in the internal variable Z for confidential computation function (S411).

Next, the confidential computation server 200 compares a norm of the internal variable Z for confidential computation function with the threshold L (S421), and proceeds to processing for performing a fourth step of the confidential computation function if the value of the norm is equal to or smaller than the threshold L (S421: norm=<L). If, on the other hand, the norm exceeds the threshold L (S421: norm>L), the confidential computation server 200 changes the norm of the internal variable Z for confidential computation function into a value not larger than L by using the ciphertext limitation information P=(p1, p2, ..., pn), stores the value in the internal variable Z for confidential computation function, and proceeds to processing for performing the fourth step of the confidential computation function (S431).

Thereafter, the fourth step to an (m-1)th step of the confidential computation function are computed in the same procedure as that in the first to third steps of the confidential computation function described above (S441).

Subsequently, the confidential computation server 200 performs computation of an m-th step of the confidential computation function by using the argument for confidential computation (c1, c2, ..., ck) and the internal variable Z for confidential computation function as a command argument, and stores the output in the internal variable Z for confidential computation function (S451).

Then, the confidential computation server 200 compares a norm of the internal variable Z for confidential computation function with the threshold L (S461), and if the value of the norm is the threshold L or smaller (S461: norm=<L), outputs the internal variable Z for confidential computation function as a confidential computation result R. If, on the other hand, the norm exceeds the threshold L (S461: norm>L), the confidential computation server 200 changes the norm of the internal variable Z for confidential computation function into a value not larger than L by using the ciphertext limitation information P=(p1, p2, ..., pn), stores the value in the internal variable Z for confidential computation function, and outputs the internal variable Z for confidential computation function as a confidential computation result R (S471). This confidential computation result R is to be returned to the client terminal 100 from the confidential computation server 200. In the above example, the confidential computation result R corresponds to a value obtained by adding up predetermined values indicated by the personal information of the m individuals.

Decryption Processing

Figure 10:
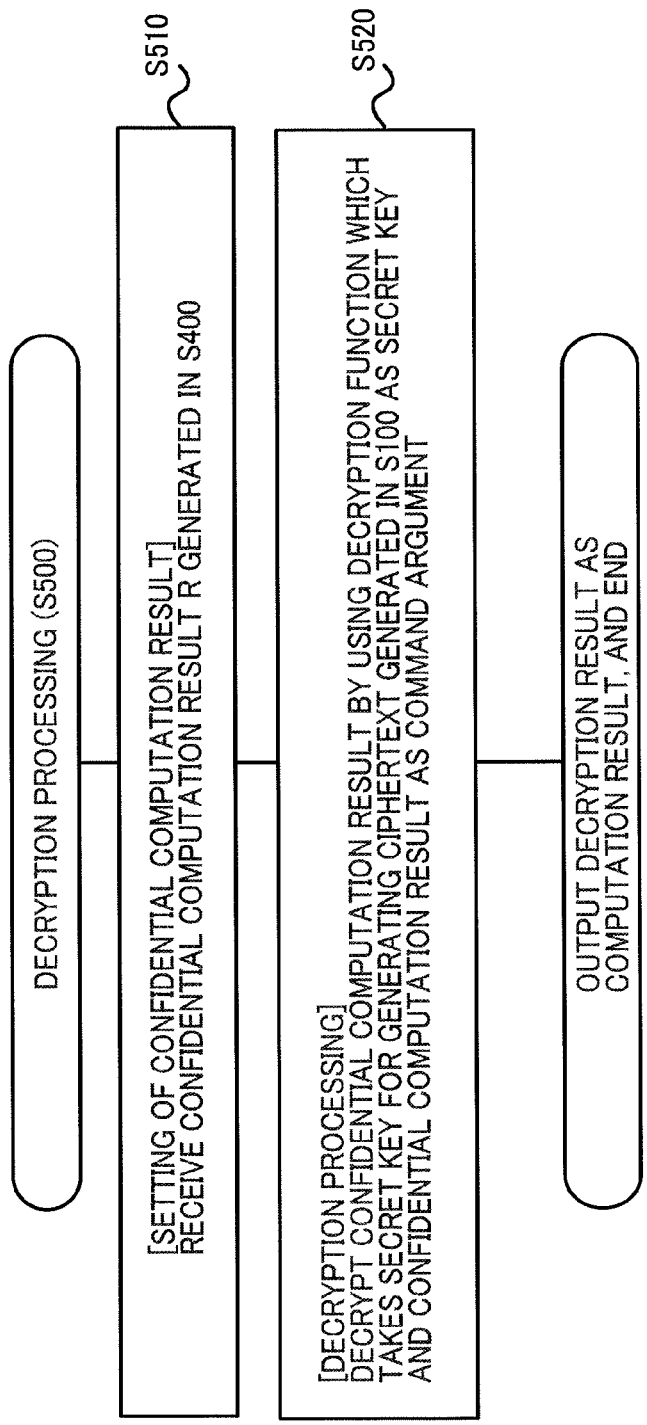
FIG. 10 is a flowchart showing a processing procedure example 7 of the confidential computation method of the present embodiment.

Next, the decryption processing is described based on a drawing. FIG. 10 is a flowchart showing a processing procedure example 7 of the confidential computation method in the present embodiment, and is, more specifically, a flow showing the processing performed by the decryption processing program (S500) in the processing flow in FIG. 4.

First, the client terminal 100 receives the confidential computation result R (D200) from the confidential computation server 200 (S510). Then, the client terminal 100 decrypts the confidential computation result R by using, as a secret key, the secret key B for generating ciphertext generated in the above-described processing by the program for generating a secret key for generating ciphertext (FIGS. 4 and 5: S100) and using a predetermined decryption function (S520). The client terminal 100 outputs a value obtained by this decryption to the display device 105 as a computation result. In the above example, the computation result outputted to the display device 105 is a sum of the personal information on the m statistical-target individuals.

Ciphertext Limitation Processing

Next, the ciphertext limitation processing is described based on a drawing. FIG. 11 is a flowchart showing a processing procedure example 8 of the confidential computation method of the present embodiment, and is, more specifically, a diagram showing the ciphertext limitation processing performed in the confidential computation processing flow (S400) in FIGS. 8 and 9.

First, the confidential computation server 200 expresses the internal variable Z for confidential computation function as a vector basis by using the ciphertext limitation information P=(p1, p2, ..., pn). Specifically, the confidential computation server 200 expresses the internal variable Z for confidential computation function as $Z = a_1 \times p_1 + a_2 \times p_2 + \ldots a_n \times p_n$ by use of real coefficients (a1, a2, ..., an) (S610). Next, the confidential computation server 200 subtracts [ai] from each ai (i=1 to n) obtained in Step S610, the [ai] being the largest integer not exceeding the real number ai, and thereby updates each coefficient ai to a value "ai−[ai]." (S620) For example, if a1 is "3.5," "3" which is the largest integer not exceeding the real number "3.5" is subtracted from "3.5" to update the coefficient al to a value "0.5."

Next, the confidential computation server 200 updates the internal variable Z for confidential computation function into Z=a1×p1+a2×p2+ . . . an×pn by using each coefficient ai obtained in Step S620 (S630), and outputs this internal variable Z for confidential computation function. Such processing is, in other words, processing for reducing the bit length of ciphertext to a predetermined value or less by translating a vector of ciphertext yet to be limited ("ai" exceeds 1) to the inside of a region formed from a sublattice basis corresponding to the ciphertext limitation information (to make "ai" 1 or smaller).

Note that the random nxn non-singular matrix U of integer coefficients generated in the above embodiment in generating the ciphertext limitation information may be a random nxn non-singular matrix U of integer coefficients in which a determinant value satisfies a certain condition. In addition, although a Euclidean norm computation approach is used as a method for computing the norm of a vector, other conventional norm computation approaches may be used instead. Moreover, although the internal variable for confidential computation is a single variable Z in the above embodiment, the internal variable for confidential computation may be a combination of multiple variables (Z1, Z2, . . . , Zk).

The best mode for carrying out the present invention and the like are specifically described above, but the present invention is not limited thereto and may be variously changed without departing from the gist thereof.

The present embodiment employs the method: using a sufficiently small error vector added in encrypting plaintext bit data by the client terminal 100 in order to suppress the "increase in an error vector caused upon re-encryption" which is a problem in the prior art; and keeping confidential a public key, which is conventionally opened, in order to prevent a lattice reduction attack, the risk of which is increased by the small error vector. The problem of an increase in the norm in ciphertext is overcome as follows. Specifically, the confidential computation server 200 acquires ciphertext limitation information (information for limiting the bit length of ciphertext to a certain constant or smaller) generated in the client terminal 100, the information being unlike a conventional public key. The ciphertext limitation information is formed from a sublattice basis of a lattice generated by a secret key, and the norm increase is prevented, whenever it occurs, by translating the ciphertext vector to a fundamental region generated by the sublattice basis. The norm can be reduced by translating the vector without changing plaintext information of the ciphertext vector since the vector added is a vector of a sublattice.

Further, since the ciphertext limitation information is a sublattice basis of a lattice which is a secret key, an encryption algorithm using a conventional public key cannot be used anyway. Thus, even if a lattice reduction attack is made on the ciphertext limitation information in the confidential computation system of the present embodiment, the probability of the ciphertext being decoded and plaintext being outputted is extremely low. Actually, the probability of the ciphertext being decoded is about D/D' where D is an absolute value of a determinant of a matrix formed from a lattice basis of a secret key and D' is an absolute value of a determinant of a matrix formed from a lattice basis of the ciphertext limitation information. Thus, by making D' sufficiently large, the probability can be made a small value which does not pose a problem in practice.

Thus, the present embodiment allows reduction in an error vector added to plaintext bit data compared to a conventional one to suppress an increase in the error vector caused by Boolean computation on the encrypted data, and at the same time, allows avoidance of a lattice reduction attack which is conventionally concerned when the error vector is small. Thus, there is no need for employing an approach that requires an extremely large amount of computation and time, like squashing. Hence, efficient computation can be executed on outsourced data in a confidential form in a computer of a party to which the data is outsourced, while maintaining favorable security.

The description herein makes at least the following points clear. Specifically, in the confidential computation system, the client may obtain a matrix product of a secret key matrix stored in the storage device and a predetermined non-singular matrix of integer coefficients and send the server a matrix which is a result of the matrix product, as the limitation information.

In addition, in the confidential computation system, the server may specify, in a linear combination formed by column vectors of the limitation information matrix which is indicated by the limitation information received from the client, a vector having the largest Euclidean distance from an origin among all vectors each multiplied by a coefficient whose absolute value is 1 or smaller, and set a distance between the specified vector and the origin as the predetermined threshold.

REFERENCE SIGNS LIST 10 confidential computation system
100 client terminal (client)
101 CPU
102 auxiliary storage device (storage device)
103 memory
104 internal signal line
105 tamper-resistant storage device
106 display device
107 I/O interface
108 communication device
200 confidential computation server (server)
201 CPU
202 auxiliary storage device (storage device)
203 memory
204 internal signal line
206 display device
207 I/O interface
208 communication device
300 network

The invention claimed is:

1. A confidential computation system which is a computer system comprising:
    a client configured to execute data encryption by a homomorphic encryption method using a secret key and send the encrypted data to a server; and
    the server configured to execute homomorphic computation processing on the encrypted data received from the client and return a result of the computation to the client, the confidential computation system characterized in that
    the client executes processing for executing the data encryption by adding an error vector to plaintext, the error vector being not larger than a predetermined criterion, and processing for sending limitation information to the server, the limitation information being formed from a sublattice basis of a lattice generated by the secret key, and the server executes processing for receiving the limitation information from the client and storing the limitation information in a storage device, and in the homomorphic computation processing on the encrypted data received from the client, processing for, when a bit length of ciphertext which is under the homomorphic computation processing or is a result of the homomorphic computation processing is equal to or larger than a predetermined value, reducing the bit length of the ciphertext to a value not larger than a predetermined threshold by translating a vector of the ciphertext to an inside of a region formed from the sublattice basis corresponding to the stored limitation information.

2. The confidential computation system according to claim 1, characterized in that the client performs matrix multiplication of a secret key matrix stored in the storage device and a predetermined non-singular matrix of integer coefficients and sends the server a matrix which is a result of the matrix multiplication, as the limitation information.

3. The confidential computation system according to claim 1, characterized in that the server specifies, in a linear combination formed by column vectors of a limitation information matrix which is indicated by the limitation information received from the client, a vector having the largest Euclidean distance from an origin among all vectors each multiplied by a coefficient whose absolute value is 1 or smaller, and sets a distance between the specified vector and the origin as the predetermined threshold.

4. A confidential computation method performed in a computer system including a client configured to execute data encryption by a homomorphic encryption method using a secret key and send the encrypted data to a server, and the server configured to execute homomorphic computation processing on the encrypted data received from the client and return a result of the computation to the client, the confidential computation method characterized by comprising:

causing the client to execute processing for executing the data encryption by adding an error vector to plaintext, the error vector being not larger than a predetermined criterion, and processing for sending limitation information to the server, the limitation information being formed from a sublattice basis of a lattice generated by the secret key, and causing the server to execute processing for receiving the limitation information from the client and storing the limitation information in a storage device, and in the homomorphic computation processing on the encrypted data received from the client, processing for, when a bit length of ciphertext which is under the homomorphic computation processing or is a result of the homomorphic computation processing is equal to or larger than a predetermined value, reducing the bit length of the ciphertext to a value not larger than a predetermined threshold by translating a vector of the ciphertext to an inside of a region formed from the sublattice basis corresponding to the stored limitation information.

5. A non-transitory computer-readable storage medium with an executable program stored thereon, wherein the program instructs a microprocessor to execute data encryption by a homomorphic encryption method using a secret key and send data obtained by the encryption to a server, and the server configured to execute homomorphic computation processing on the encrypted data received from the client and return a result of the computation to the client, the confidential computation program causing the server to execute processing for receiving, from the client, limitation information formed from a sublattice basis of a lattice generated by the secret key, and storing the limitation information in a storage device, and in the homomorphic computation processing on the encrypted data received from the client, processing for, when a bit length of ciphertext which is under the homomorphic computation processing or is a result of the homomorphic computation processing is equal to or larger than a predetermined value, reducing the bit length of the ciphertext to a value not larger than a predetermined threshold by translating a vector of the ciphertext to an inside of a region formed from the sublattice basis corresponding to the stored limitation information.

* * * * *